March 28, 1967 S. J. SIRIANNI 3,310,996
ACCELERATOR PEDAL
Filed July 12, 1965
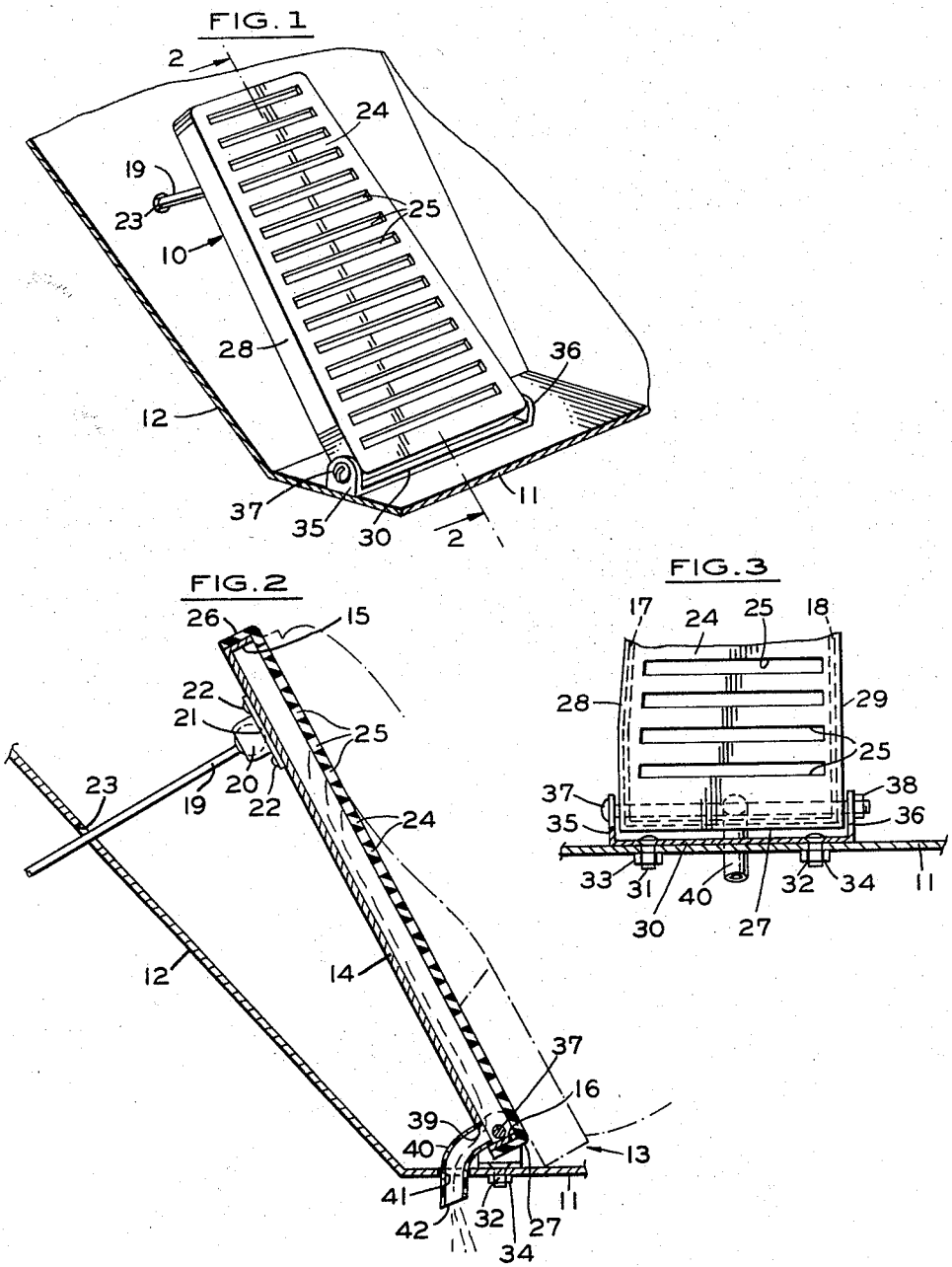
INVENTOR.
SAMUEL J. SIRIANNI
BY
Donnelly, Mentag & Herrington
ATTORNEYS United States Patent Office 3,310,996
Patented Mar. 28, 1967

3,310,996
ACCELERATOR PEDAL
Samuel J. Sirianni, 5245 Reuter,
Dearborn, Mich. 48126
Filed July 12, 1965, Ser. No. 471,033
6 Claims. (Cl. 74—560)

ABSTRACT OF THE DISCLOSURE

An accelerator pedal including a hollow elongated member with openings on the upper side on which the foot of the driver of a vehicle is placed, and drainage means for draining the hollow elongated member to the exterior of a vehicle wherein the accelerator pedal is hingedly mounted.

This invention relates generally to a novel and improved vehicle accelerator pedal, and more particularly, to a vehicle accelerator pedal which is adapted to catch moisture carried into the vehicle on the foot of a driver and exhaust it from the vehicle.

Heretofore, when moisture was carried into a vehicle on the foot of the driver, as for example, the moisture from snow on the foot which is used to operate the accelerator pedal, it accumulated on the face of the accelerator pedal and then ran down onto the floor of the vehicle. Such a condition is undersirable both from the standpoint of the accelerator pedal itself and from the comfort of the driver. One disadvantage of excess moisture on the floor of an automobile is that the cuffs of the pants of the driver drag in the moisture on the floor and become wet. Another disadvantage is the fact that the face of the accelerator pedal becomes slippery because of the moisture on the face of the accelerator pedal and such a condition is not consistent with good driving conditions.

Accordingly, in view of the foregoing, it is an important object of the present invention to provide a novel and improved vehicle accelerator pedal which is adapted to catch moisture that is carried into a vehicle on the accelerator operating foot of a driver and exhaust it from the automobile.

It is another object of the present invention to provide a novel and improved vehicle accelerator pedal which is provided with a plurality of openings on the front face thereof, and a compartment below the openings into which melted snow and other moisture is adapted to be collected and exhausted to the exterior of the vehicle through an exhaust or drainage tube.

It is a further object of the present invention to provide a novel and improved vehicle accelerator pedal which is simple and compact in construction, economical to manufacture, and efficient in operation.

It is still another object of the present invention to provide a novel and improved vehicle accelerator pedal which includes a lower portion that is box-shaped and open on the upper end thereof, an upper portion mounted over the lower portion and having a plurality of holes therethrough, means for hingedly mounting the lower end of the accelerator pedal to the floor of the vehicle, and means for exhausting moisture passing into the box-like lower portion of the accelerator pedal to the exterior of the vehicle.

Other objects, features and advantages of this invention will be apparent from the following detailed description, appended claims, and the accompanying drawing.

In the drawing:

FIG. 1 is a perspective view of an accelerator pedal made in accordance with the principles of the present invention and showing the pedal attached to the floor of a vehicle;

FIG. 2 is an elevational, section view of the structure illustrated in FIG. 1, taken along the line 2—2 thereof, and looking in the direction of the arrows; and FIG. 3 is a partial, front elevational view of the structure illustrated in FIG. 2, taken from the right side thereof.

Referring now to the drawing and in particular to FIG. 1, the numeral 10 generally indicates an accelerator pedal made in accordance with the principles of the present invention. The numerals 11 and 12 indicate the horizontal, and the front upwardly sloping floor portions, respectively, of a vehicle, such as a passenger automobile. The numeral 13 in FIG. 2 generally indicates the driver's foot that operates the accelerator pedal 10.

As illustrated in FIG. 2, the accelerator pedal 10 is box-shaped and includes the box-shaped lower portion having the bottom wall 14, the top end wall 15, the bottom end wall 16, and the left and right side walls 17 and 18. As shown, the lower box-shaped portion is made with the aforementioned end and side walls integrally connected to the bottom wall.

The accelerator pedal 10 is connected in a suitable operative manner to the usual accelerator rod 19, as illustrated in FIG. 2. The upper end of the accelerator rod 19 could be connected by any suitable means to the pedal 10, as for example by the connection member 20 which is fixed to the bottom wall 14 by the flange 21 and a plurality of rivets 22. The accelerator rod 19 extends downwardly through the hole 23 formed in the sloping floor portion 12.

As shown in FIGS. 1, 2 and 3, the accelerator pedal 10 further includes an upper portion having the top wall 24 through which is formed a plurality of longitudinally spaced apart, transversely disposed slots or holes 25. The pedal upper portion includes the top end wall 26, the bottom end wall 27, and the left and right side walls 28 and 29, respectively. The aforementioned end and side walls are preferably integrally formed with the top wall 24. The top portion of the pedal is preferably made so as to enclose the lower portion of the pedal in the same manner as the cover of a box. The pedal lower portion may be made from any suitable material, as for example, a metallic material. The upper portion of the pedal may be made from any suitable material, as for example, rubber or a metal covered with rubber.

As best seen in FIGS. 2 and 3, the accelerator pedal 10 is hingedly connected to the floor 11 by means of a suitable bracket comprising a horizontal portion 30 which is fixedly secured to the floor 11 by means of the bolts 31 and 32 and the nuts 33 and 34, respectively. Integrally formed on the bracket horizontal portion 30 are the pair of spaced apart, vertically disposed bracket legs 35 and 36 which are formed with suitable holes through which are mounted the hinge pin or bolt 37. Hinge pin 37 extends through suitable holes formed in the lower end of the accelerator pedal so as to hingedly mount the pedal 10 between the bracket legs 35 and 36. The hinge pin 37 is secured in place by any suitable means, as by the nut 38.

As shown in FIG. 2, a hole 39 is formed through the bottom wall 14 of the lower portion of the pedal, adjacent the lower end thereof, preferably in a central location. Fixedly mounted in hole 39 is an exhaust or drain pipe 40 which is adapted to extend downwardly through the hole 41 formed in the floor 11. The end of the exhaust pipe 40 is indicated by the numeral 42 in FIG. 2.

It will be seen that any moisture on the foot 13 of the driver will flow through the holes 25 into the hollow pedal 10. The moisture then flows downwardly on the inside surface of the bottom wall 14 to the exhaust or drainage pipe 40. The moisture is then exhausted to the exterior of the vehicle through the drain pipe 40. As the accelerator pedal 10 is moved downwardly, or counterclockwise as viewed in FIG. 2, the drain pipe 40 is adapted to move through the hole 41 to permit regular operation of the accelerator pedal. It will be seen that the discharge end 42 of the pipe 40 is disposed so as to face slightly towards the rear of the vehicle for assisting the discharge of moisture from the drain pipe by means of air flowing past the end 42 of the pipe from the left to the right, as viewed in FIG. 2, because of the motion of the vehicle in a forward direction, or to the left as viewed in FIG. 2.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:
1. An accelerator pedal comprising:
   (a) a hollow elongated member;
   (b) said elongated member being provided with a plurality of openings on the upper side thereof on which the foot of the driver of the vehicle is disposed for operating the accelerator pedal; and,
   (c) means connected to the hollow interior of the pedal for draining moisture from the pedal which flows into the pedal through said openings.
2. An accelerator pedal as defined in claim 1, wherein:
   (a) said hollow elongated member includes,
       (1) a box-shaped lower portion, and,
       (2) a box-shaped upper portion mounted over said lower portion.
3. An accelerator pedal as defined in claim 1, including:
   (a) means for hingedly mounting the accelerator pedal in an operative position in a vehicle.
4. An accelerator pedal comprising:
   (a) a hollow elongated member;
   (b) said elongated member being provided with a plurality of openings on the upper side thereof on which the foot of the driver of the vehicle is disposed for operating the accelerator pedal;
   (c) means connected to the hollow interior of the pedal for draining moisture from the pedal which flows into the pedal through said openings; and,
   (d) said means connected to the interior of the pedal for draining moisture from the pedal including a drain tube connected to the lower end of the hollow elongated member for receiving moisture from the hollow interior of the pedal and exhausting it to the exterior of the vehicle.
5. An accelerator pedal as defined in claim 4, including:
   (a) means for hingedly mounting the accelerator pedal in an operative position in a vehicle.
6. An accelerator pedal as defined in claim 4, wherein:
   (a) said hollow elongated member includes;
       (1) a box-shaped lower portion, and,
       (2) a box-shaped upper portion mounted over said lower portion.

References Cited by the Examiner
UNITED STATES PATENTS

| | | | |
|---|---|---|---|
| 961,442 | 6/1910 | Hartzell | 74—560 |
| 2,792,721 | 5/1957 | Di Giovanni | 74—560 |

FRED C. MATTERN, Jr., *Primary Examiner.*